US006574892B2

(12) United States Patent
Creighton

(10) Patent No.: US 6,574,892 B2
(45) Date of Patent: Jun. 10, 2003

(54) RETAINER PIN HAVING AN INTERNAL SECONDARY RETAINER PIN

(75) Inventor: George S. Creighton, Flower Mound, TX (US)

(73) Assignee: TRN Business Trust, Dallas, TX (US)

( * ) Notice: Subject to any disclaimer, the term of this patent is extended or adjusted under 35 U.S.C. 154(b) by 0 days.

(21) Appl. No.: 09/947,239

(22) Filed: Sep. 5, 2001

(65) Prior Publication Data

US 2003/0041486 A1 Mar. 6, 2003

(51) Int. Cl.$^7$ ................................................. E02F 9/28
(52) U.S. Cl. ........................................................ 37/456
(58) Field of Search ........................... 37/450–459, 446; 403/413, 379, 374; 172/772.5, 753, 701.3

(56) References Cited

U.S. PATENT DOCUMENTS

| 1,216,290 A | | 2/1917 | Dickson | |
|---|---|---|---|---|
| 1,419,047 A | | 6/1922 | Hanks et al. | |
| 1,845,677 A | | 2/1932 | Mekeel | |
| 2,064,059 A | | 12/1936 | Fellmeth | 37/142 |
| 2,113,420 A | | 4/1938 | Younie | 37/141 |
| 2,618,873 A | | 11/1952 | Hostetter | 37/142 |
| 2,635,366 A | | 4/1953 | Hostetter | 37/142 |
| 2,689,419 A | | 9/1954 | Daniels et al. | 37/142 |
| 2,934,842 A | | 5/1960 | Van Buskirk | 37/142 |
| 3,498,677 A | * | 3/1970 | Morrow | 37/456 |
| 3,787,132 A | | 1/1974 | Garnett | 403/290 |
| 3,831,298 A | | 8/1974 | Helton et al. | 37/142 A |
| 3,839,805 A | | 10/1974 | Stepe | 37/142 |
| 3,896,569 A | | 7/1975 | Thompson et al. | 37/141 |
| 3,967,399 A | * | 7/1976 | Heinold et al. | 37/452 |
| 3,974,579 A | | 8/1976 | Black et al. | 37/141 |
| 3,982,339 A | | 9/1976 | Nilsson | 37/141 |
| 4,067,657 A | | 1/1978 | Kaariela | 403/317 |
| 4,233,761 A | | 11/1980 | Ryerson | 37/142 |

(List continued on next page.)

FOREIGN PATENT DOCUMENTS

| EP | 0 717 204 A1 | 6/1996 | ........... F16B/21/12 |
|---|---|---|---|
| GB | 303708 | 1/1929 | |
| GB | 364531 | 12/1931 | |
| GB | 836167 | 6/1960 | ........ B23B/F06B,D |

OTHER PUBLICATIONS

"Dragline Products—Hensley Style" (eleven pages)—No date.
"Keech Castings Australia PTY. Limited," Aug. 31, 1995 (one page)—No date.
"Maglok® System," *Quality Steel Foundries Ltd.*—No date.
"Mining Vertalok® Adapters for Shovel Dippers," ©1992 ESCO Corporation. (4 pages).
"Posilok® Tooth Systems" (one page)–No date.
"Torqlok ® System," *Quality Steel Foundries Ltd.*—(one page) No date.
International Search Report mailed Dec. 11, 2002 in re PCT/US/02/27402 filed Aug. 27, 2002 (8 pages).

*Primary Examiner*—Robert E. Pezzuto
(74) *Attorney, Agent, or Firm*—Baker Botts L.L.P.

(57) ABSTRACT

The present invention includes a primary retainer pin having an internal secondary retainer pin operable to couple the primary retainer pin with an adapter for use with excavation equipment components. A removable tooth having first and second tooth sides is coupled with the adapter and at least partially covers the first adapter end. A central portion of the adapter defines an elongate slot which extends from a first adapter side to a second adapter side. First and second tooth sides include first and second openings, respectively, configured such that the first and second openings are aligned with an imaginary longitudinal axis of the elongate slot while the removable tooth is coupled with the adapter. The primary retainer pin extends at least partially through the first and second openings, and the elongate slot, to couple the removable tooth and the adapter. The secondary retainer pin engages the adapter, adjacent a recessed cavity which extends from the elongate slot, to limit movement of the primary retainer pin along the imaginary longitudinal axis.

25 Claims, 4 Drawing Sheets

U.S. PATENT DOCUMENTS

| | | | |
|---|---|---|---|
| 4,247,147 A | 1/1981 | Rettkowski | 299/10 |
| 4,271,615 A | 6/1981 | Jones | 37/142 A |
| 4,326,348 A | 4/1982 | Emrich | 37/142 |
| 4,335,532 A | 6/1982 | Hahn et al. | 37/142 |
| 4,404,760 A * | 9/1983 | Hahn et al. | 37/457 |
| 4,433,496 A | 2/1984 | Jones et al. | 37/141 R |
| 4,481,728 A | 11/1984 | Mulder et al. | 37/142 |
| 4,587,751 A | 5/1986 | Sjogren et al. | 37/142 |
| 4,662,762 A | 5/1987 | Schwarz | 384/25 |
| 4,663,867 A | 5/1987 | Hahn et al. | 37/142 |
| 4,716,667 A | 1/1988 | Martin | 37/142 |
| 4,727,663 A | 3/1988 | Hahn | 37/142 |
| 4,823,487 A | 4/1989 | Robinson | 37/142 |
| RE33,042 E | 9/1989 | Emrich | 37/142 |
| 4,895,459 A | 1/1990 | Werner | 384/43 |
| 4,941,758 A | 7/1990 | Osawa | 384/40 |
| 5,009,017 A | 4/1991 | Diekevers et al. | 37/142 |
| 5,074,062 A | 12/1991 | Hahn et al. | 37/142 |
| 5,081,774 A | 1/1992 | Kuwano | 137/142 |
| 5,088,214 A | 2/1992 | Jones | 37/141 |
| 5,111,600 A | 5/1992 | Lukavich et al. | 37/141 |
| 5,152,088 A | 10/1992 | Hahn | 37/142 |
| 5,172,501 A | 12/1992 | Pippins | 37/142 |
| 5,181,780 A | 1/1993 | Morita | 384/8 |
| 5,233,770 A | 8/1993 | Robinson | 37/456 |
| 5,297,873 A | 3/1994 | Komiya | 384/45 |
| 5,337,495 A | 8/1994 | Pippins | 37/453 |
| 5,361,520 A | 11/1994 | Robinson | 37/458 |
| 5,410,826 A | 5/1995 | Immel et al. | 37/457 |
| 5,423,138 A | 6/1995 | Livesay et al. | 37/456 |
| 5,435,084 A | 7/1995 | Immel | 37/398 |
| 5,452,529 A | 9/1995 | Neuenfeldt et al. | 37/455 |
| 5,469,648 A | 11/1995 | Jones et al. | 37/457 |
| 5,484,210 A | 1/1996 | Gallone | 384/49 |
| 5,491,915 A | 2/1996 | Robinson | 37/458 |
| 5,638,621 A | 6/1997 | Keech et al. | 37/446 |
| 5,709,043 A | 1/1998 | Jones et al. | 37/458 |
| 5,802,795 A | 9/1998 | Myers et al. | 52/426 |
| 5,926,982 A | 7/1999 | Keech et al. | 37/455 |
| 5,937,550 A | 8/1999 | Emrich | 37/458 |
| 5,947,209 A * | 9/1999 | Halford et al. | 172/772.5 |
| 5,983,534 A * | 11/1999 | Robinson et al. | 37/459 |
| 5,992,063 A | 11/1999 | Mack | 37/450 |
| 6,000,153 A | 12/1999 | Sollami | 37/453 |
| 6,013,078 A | 1/2000 | Lin | 606/72 |
| 6,018,896 A | 2/2000 | Adamic | 37/456 |
| 6,052,927 A | 4/2000 | Pippins | 37/454 |
| 6,092,958 A | 7/2000 | Gale | 403/378 |
| 6,108,950 A | 8/2000 | Ruvang et al. | 37/452 |
| 6,119,378 A | 9/2000 | Pippins | 37/454 |
| 6,151,812 A | 11/2000 | Bierwith | 37/455 |
| 6,247,255 B1 | 6/2001 | Clendenning | 37/452 |
| 6,374,521 B1 | 4/2002 | Pippins | 37/456 |

* cited by examiner

US 6,574,892 B2

RETAINER PIN HAVING AN INTERNAL SECONDARY RETAINER PIN

TECHNICAL FIELD OF THE INVENTION

The present invention relates generally to replaceable excavation equipment components that are exposed to high wear and repeated shock loading such as removable teeth and adapter assemblies used on excavating machines, and more particularly, to a retainer pin having an internal secondary retainer pin, for coupling excavation components.

BACKGROUND OF THE INVENTION

Digging and leveling apparatus such as drag lines, back hoes, front-end loaders, bulldozers, and the like often use replaceable teeth and adapter assemblies which are mounted on a tooth horn to provide sacrificial parts that are exposed to the repeated shock loading and high wear occasioned by digging operations. In such systems, adapter assemblies may include a wedge-shaped adapter which mounts directly on the tooth horn of a bucket, shovel or alternative digging or scraping mechanism of the equipment. The wedge-shaped adapter is frontally seated on and coupled with the tooth horn for receiving a removable tooth.

SUMMARY OF THE INVENTION

The present invention includes a primary retainer pin having an internal secondary retainer pin operable to couple the primary retainer pin with an adapter for use with excavation equipment components. The primary retainer pin may be used to couple removable excavation equipment components with the adapter. The configuration of the primary retainer pin substantially eliminates or reduces disadvantages or problems associated with previously developed fastening methods and apparatus. In particular, the present invention provides a system and method for coupling a removable tooth with an adapter assembly in a simplified manner, using the primary and secondary retainer pins. The lateral movement of the primary retainer pin with respect to the adapter is restricted by the use of the secondary retainer pin.

In accordance with a particular embodiment of the present invention, an adapter assembly for use with excavation equipment includes an adapter having first and second adapter ends, and first and second adapter sides. A removable tooth having first and second tooth sides is coupled with the adapter and at least partially covers the first adapter end. A central portion of the adapter defines an elongate slot which extends from the first adapter side to the second adapter side. The first and second tooth sides include first and second openings, respectively, configured such that the first and second openings are aligned with an imaginary longitudinal axis of the elongate slot while the removable tooth is coupled with the adapter. A primary retainer pin extends at least partially through the first and second openings, and the elongate slot. The retainer pin is operable to cooperate with the adapter adjacent the first and second openings, to couple the removable tooth and the adapter. A secondary retainer pin extends from the primary retainer pin, and at least partially into a cavity that extends from the elongate slot, the cavity being formed in the central portion of the adapter. The secondary retainer pin engages the adapter, adjacent the recessed cavity, to limit movement of the first retainer pin along the imaginary longitudinal axis.

In accordance with another embodiment of the present invention, the primary retainer pin includes an oblong cross section, and the elongate slot includes a corresponding oblong shape. In this embodiment, the secondary retainer pin extends along a plane parallel to an axis through the longest dimension of the cross section.

Technical advantages of particular embodiments of the present invention include a system and method for securely coupling a removable tooth with an adapter using a primary retainer pin. The primary retainer pin is prevented from lateral movement, which prevents inadvertent decoupling of the removable tooth and the adapter.

Another technical advantage of particular aspects of the present invention includes a system and method for coupling a removable tooth with an adapter such that the removable tooth and the adapter may be easily decoupled in the field by an operator. The decoupling of the removable tooth from the adapter may be accomplished by using simple hand and/or power tools.

Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the invention, and for further features and advantages, reference is now made to the following description, taken in conjunction with the accompanying drawings, in which.

DETAILED DESCRIPTION OF THE INVENTION

Figure 1:
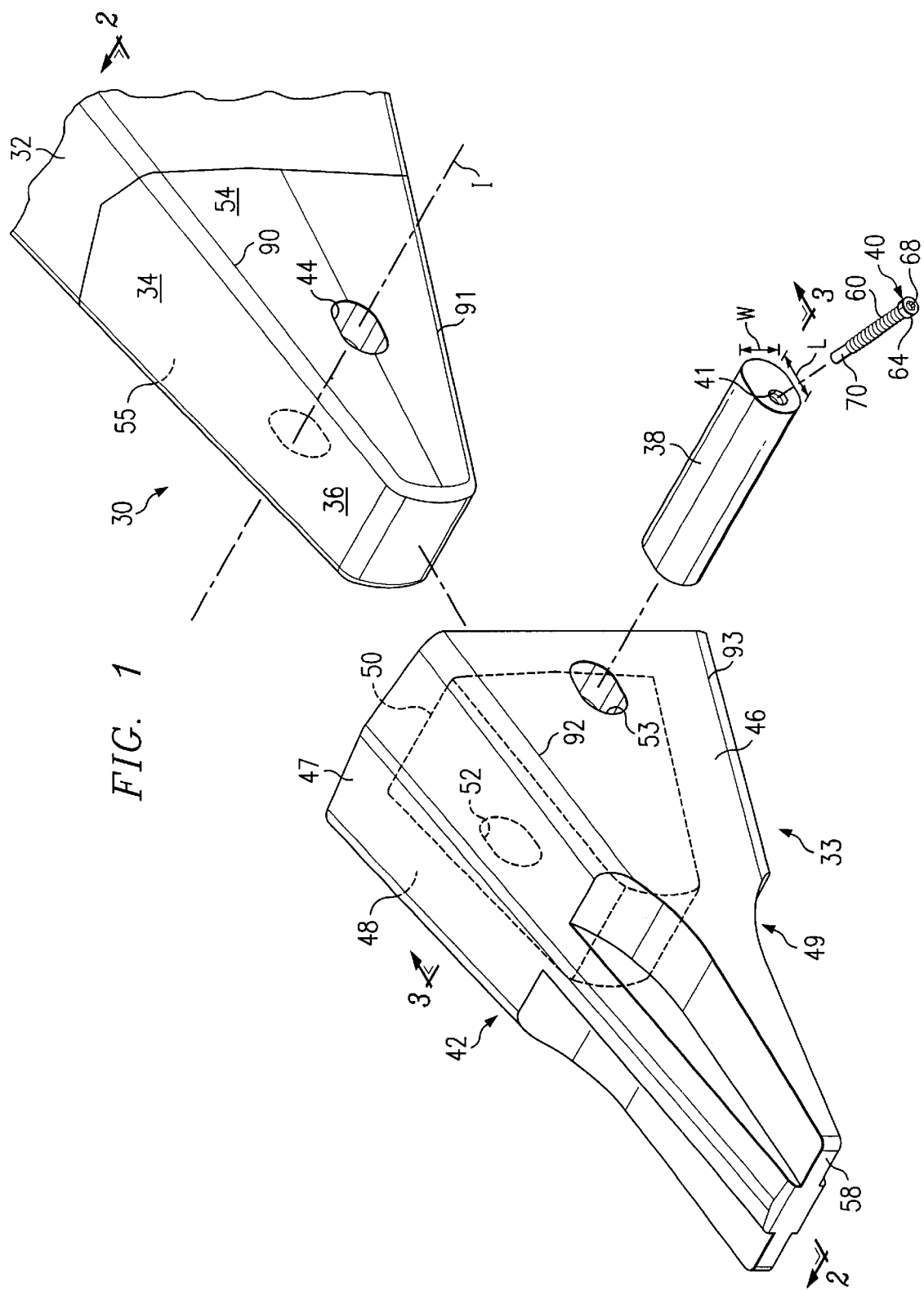
FIG. 1 is an isometric exploded view of an adapter and removable tooth which may be coupled according to a particular embodiment of the present invention.
Figure 2:
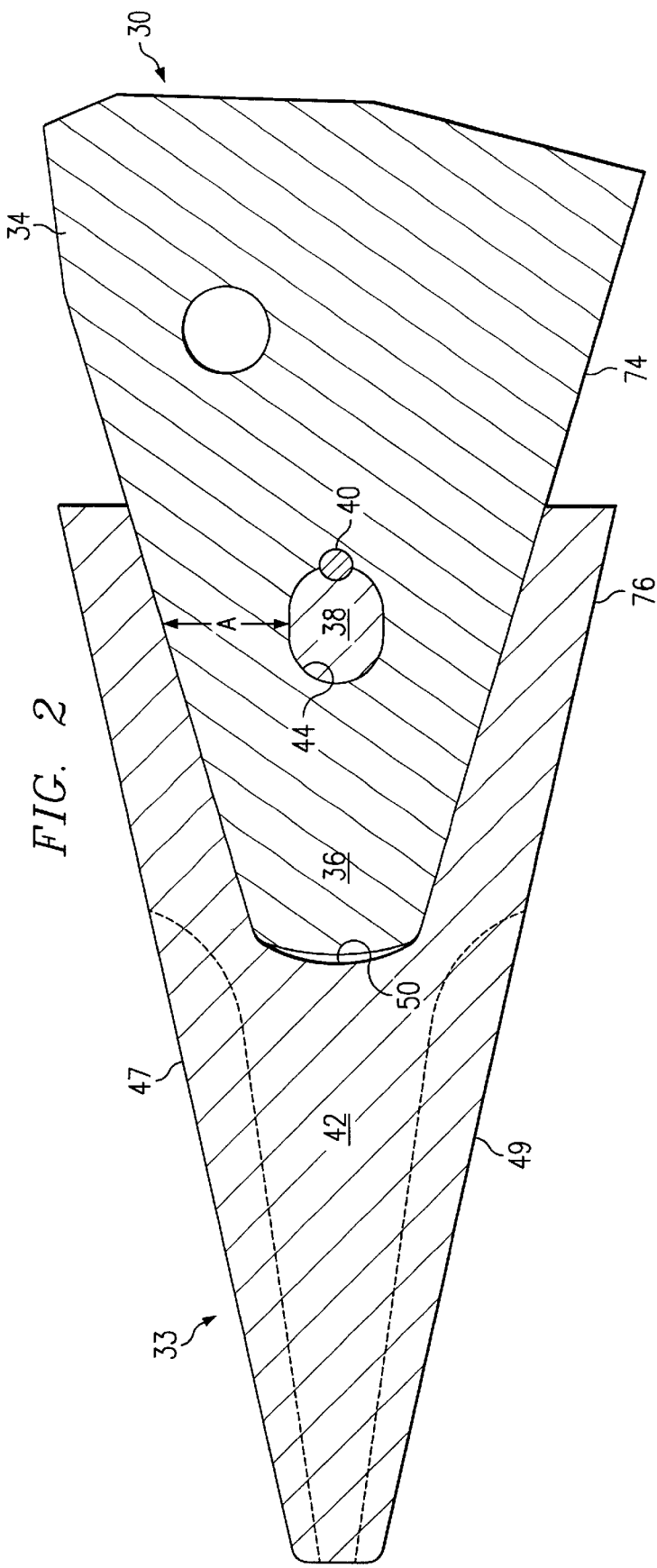
FIG. 2 is a cross sectional view taken through the line 2—2 of the removable tooth and adapter assembly of FIG. 1.
Figure 3:
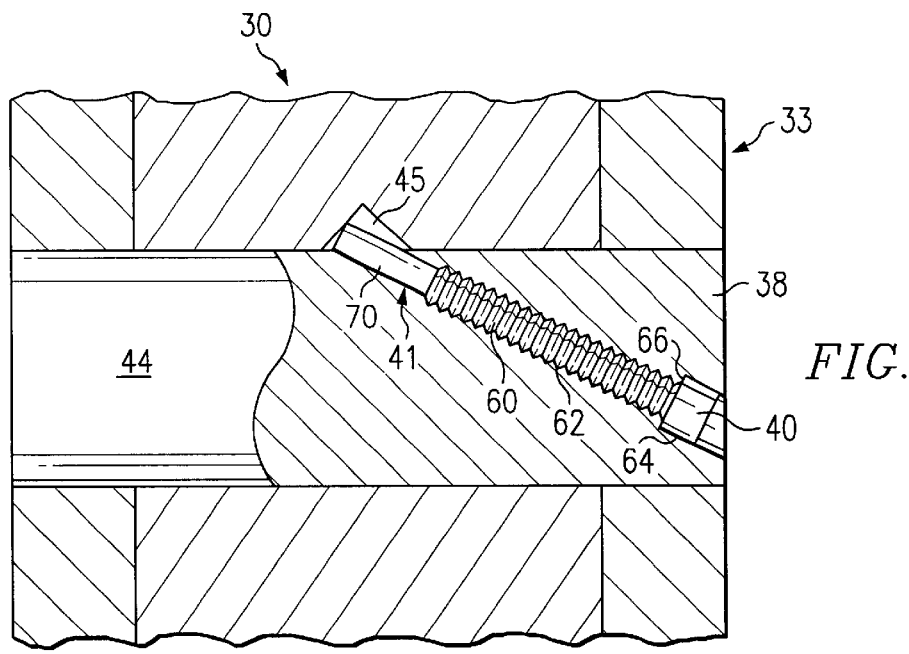
FIG. 3 is a cross sectional view taken through the line 3—3 of the removable tooth and adapter assembly of FIG. 1.

FIGS. 1–3 illustrate an adapter 30 that may be permanently or removably coupled with a tooth horn 32 of a bucket, shovel or other part of an excavating machine or excavation equipment component. Adapter 30 may also be permanently or removably coupled with a shank of a dozer, or other excavation machine. Accordingly, adapter 30 includes a first end 34 configured to receive tooth horn 32 at least partially therein. A second end 36 of adapter 30 is configured to receive a removable tooth 33 thereon. A primary retainer pin 38 secures removable tooth 33 in place upon adapter 30. A secondary retainer pin 40 extends from primary retainer pin 38 and engages adapter 30, to limit lateral movement of primary retainer pin 38 with respect to adapter 30, along an imaginary longitudinal central axis of primary retainer pin 38. This prevents decoupling of removable tooth 33 and adapter 30. Secondary retainer pin 40 may be retracted from engagement with adapter 30 and into primary retainer pin 38, to allow the removal of primary retainer pin 38 from adapter 30. After primary retainer pin 38 is removed from adapter 30, removable tooth 33 and adapter 30 may be decoupled. Secondary retainer pin 40 may be extended and/or retracted to/from engagement with adapter 30 by hand, and/or using simple hand tools.

Primary retainer pin 38 and secondary retainer pin 40 cooperate with adapter 30 and removable tooth 33 to provide for the simplified installation and/or removal of removable tooth 33 from adapter 30. Such removable teeth may be installed, removed or replaced by an operator in the field, quickly and easily. The configuration of adapter assembly 30, primary retainer pin 38 and secondary retainer pin 40 prevent shifting of primary retainer pin 38 and, therefore, decoupling of adapter 30 and tooth 33, during use. Accordingly, primary retainer pin 28 couples removable tooth 33 with adapter 30, and secondary retainer pin 40 couples primary retainer pin 38 with adapter 30.

Removable tooth 33 is subject to significant wear and tear during excavation and/or mining operations. Extreme shock loading is experienced as removable tooth 33 impacts adjacent earth, rocks, and other abrasive material. Therefore, it is desirable to make removable tooth 33 readily replaceable with a new or reconditioned tooth of similar or identical configuration. Otherwise, adapter 30, or buckets, shovels or other excavation equipment would need to be replaced more frequently, increasing equipment and labor costs associated therewith. By providing a removable tooth 33 at a location upon adapter 30 that would otherwise experience the most wear, the service life of such equipment is prolonged by replacing selected parts associated with the excavation equipment.

In order to prevent excessive wear of adapter 30 and/or tooth horn 32, for example, removable tooth 33 is coupled with and at least partially conceals and/or protects adapter 30 from abrasive materials during excavation. Removable tooth 33 includes a rigid tapered body portion 42. Tapered body portion 42 generally includes four sides 46–49, which cooperate to define a recess 50 at first end 34. Recess 50 is configured to receive adapter 30 at least partially therein. Sides 46 and 48 are spaced from one another at first adapter end 34. Sides 46 and 48 are tapered, and converge at second end 36.

Sides 46 and 48 include respective openings 52 and 53, which are configured to receive primary retainer pin 38 at least partially therethrough. Openings 52 and 53 are generally aligned with one another, such that primary retainer pin 38 may extend at least partially through each of openings 52 and 53, while removable tooth 33 is in an installed position. The respective positions of opening 52 and 53 upon sides 46 and 48, respectively, are selected to align with an elongate slot 44 that extends from a first side 54 of adapter 30 to a second side 55 of adapter 30. In other words, when removable tooth 33 is properly positioned upon adapter 30, elongate slot 44, and openings 52 and 53 are aligned such that an imaginary central longitudinal axis I through elongate slot 44 extends through opening 52 and 53. This allows primary retainer pin 38 to extend from elongate slot 44 at least partially into each of openings 52 and 53, while primary retainer pin 38 is in the installed position.

Primary retainer pin 38 of the illustrated embodiment includes an elongate body 82, having an oblong cross-section. Elongate body 82 has a long dimension L, and a wide dimension W. Long dimension L is longer than wide dimension W. Bore 41 is configured such that it extends along a plane parallel with an axis through long dimension L. This configuration provides more support for the coupling between secondary retainer pin 40 and primary retainer pin 38. If elongate slot 44 were configured to extend along wide dimension W, then secondary retainer pin 38 would be shorter, and there would be less surface area interface between primary retainer pin 38 and secondary retainer pin 40. In such a configuration, secondary retainer pin 38 would be more likely to fracture from external forces during operation.

This configuration of primary retainer pin 38 also limits the amount of material removed or deleted from adapter 30 to form elongate slot 44. Accordingly, adapter 30 maintains strength that would otherwise be lost, if elongate slot had a round cross-section having a diameter equal to long dimension L. Similarly, the corresponding configuration of openings 52 and 53 within removable tooth 33 maintains strength in sides 46 and 48 that would otherwise be lost if openings 52 and 53 were round openings, having a diameter slightly larger than long dimension L.

Referring to FIG. 1, the configuration of elongate slot 44 maintains a significant thickness of material between elongate slot 44 and edges 90 and 91 of adapter 30 (e.g., distance A of FIG. 2). This thickness would be substantially reduced if elongate slot 44 had a circular cross-section with a diameter approximately equal to L. The additional thickness of material due to the oblong cross-section provides additional strength at critical locations upon adapter 30, and prevents fracture. Similarly, the oblong cross-section of opening 53 provides additional material (and therefore, added strength) between opening 53 and edges 92 and 93.

The illustrated configuration of primary retainer pin 38 also prevents rotation of primary retainer pin 38 within adapter 30. The cooperation between primary retainer pin 38 and correspondingly shaped elongate slot 44 secures primary retainer pin firmly in place to avoid wear associated with rotation of primary retainer pin 38 within adapter 30.

It will be obvious to those of ordinary skill in the art that elongate body 82 and/or primary retainer pin 38 may be formed in various configurations, within the teachings of the present invention. For example, elongate body 82 may have a circular, square, rectangular or other shaped cross-section. Similarly, the orientation of secondary retainer pin 40 may be altered, in alternative embodiments. For example, if elongate body 82 includes an oblong cross-section, secondary retainer pin 40 may be installed such that it extends across the wide dimension W, in lieu of long dimension L.

The configuration of tapered body portion 42 may vary significantly within the teachings of the present invention. For example, although sides 46 and 48 are each tapered and sides 47 and 49 are generally parallel with one another, other embodiments may include only one tapered side. Alternatively, more than two of sides 46–49 may be tapered, within the teachings of the present invention. Furthermore, tapered body portion 42 may include fewer or more than four sides in various embodiments. In general, the configuration of removable tooth 33 and tapered body portion 42 are selected to receive and provide protection to second end 36 of adapter 30, and to provide a material engaging surface 58 to removable tooth 33.

Adapter 30 includes recessed cavity 45 (FIG. 3) that extends from elongate slot 44. Recessed cavity 45 is configured to receive secondary retainer pin 40 at least partially therein. Secondary retainer pin 40 includes threads 60 that extends along a mid-portion of secondary retainer pin 40. Threads 60 are configured to cooperate with a corresponding threaded portion 62 associated with a bore 41, which extends at least partially through primary retainer pin 38. A screw head 64 is positioned at one end of secondary retainer pin 40. Screw head 64 is configured to cooperate with a corresponding shoulder 66 formed by the configuration of bore 41. Shoulder 66 prevents secondary retainer pin 40 from being inserted within bore 41 beyond an installed position of secondary retainer pin 40.

Screw head 64 also includes at least one groove, or recess 68, which is configured to cooperate with a tool to extend or retract secondary retainer pin 40 to/from the installed position within bore 41. Recess 68 may be configured to cooperate with simple hand tools, such as a screwdriver or power drill head. Accordingly, recess 68 may include a standard or phillips head type screw receptacle. Similarly, recess 68 may comprise a square recess configured to receive a socket wrench or an allen-type recess configured to receive an allen wrench. In other embodiments, recess 68 may comprise a protrusion configured to cooperate with tools other than those described above. For example, screw head 64 may include a fastener head configuration in order to cooperate with various hand or power (impact) wrenches. The specific configuration of screw head 64 may vary significantly within the teachings of the present invention. The configuration is generally selected to cooperate with one or more hand or power tools to allow for the installation or removal of secondary retainer pin 40 from bore 41.

Tip 70 of secondary retainer pin's 40 other end is configured to be received within recessed cavity 45 of primary retainer pin 38. In the illustrated embodiment, recessed cavity 45 comprises a cylindrical cutout at a central portion of adapter 30. However, other configurations are possible for recessed cavity 72. For example, recessed cavity 45 may be threaded and secondary retainer pin 40 may include threads which cooperate to couple secondary retainer pin 40 with adapter 30. Alternatively, recess 72 may comprise any hole extending at least partially into adapter 30, from elongate slot 44. Any recessed portion of any size or configuration suitable to receive a tip similar to tip 70, and prevent lateral movement of primary retainer pin 38 with respect to adapter 30, is suitable for use within the teachings of the present invention.

In the illustrated embodiment, screw head 64 is recessed with respect to an exterior surface 74 of primary retainer pin 38. In the installed position, primary retainer pin 38 is recessed with respect to tooth 33 and retainer pin 38. Accordingly, tooth 33 and primary retainer pin 38 protect screw head 64 and secondary retainer pin 40 from abrasive material encountered during operation.

Primary retainer pin 38 of the present invention is configured such that its ends are recessed with respect to the surfaces of sides 46 and 48 of removable tooth 33. This feature protects primary retainer pin 38 from damage or breakage during operation. In a particular embodiment of the present invention, primary retainer pin 38 need only be long enough to protrude slightly into openings 52 and 53, to allow retainer pin to cooperate with removable tooth 33, adjacent openings 52 and 53, to maintain the coupling between removable tooth 33 and adapter 30.

In order to install removable tooth 33 upon adapter 30, recess 50 of removable tooth 33 is aligned with second end 36 of adapter 30, and removable tooth 33 is placed over second end 36. Openings 52 and 53 of sides 46 and 48, respectively, are each aligned with elongate slot 44. Primary retainer pin 38 is inserted through opening 52, elongate slot 44, and at least partially into opening 53. In its installed position, primary retainer pin 38 extends from elongate slot 44 at least partially into each of openings 52 and 53.

Secondary retainer pin 40 is installed within bore 41 until threads 60 engage threaded portion 62 of primary retainer pin 38. Rotation of screw head 64 in a clockwise direction directs secondary retainer pin 40 into bore 41, toward recessed cavity 45. Secondary retainer pin 40 is prevented from additional movement toward primary retainer pin 38 when screw head 64 engages shoulder 66 and/or tip 70 extends into recessed cavity 45 and engages adapter 30. While secondary retainer pin 40 is in the installed position, tip 70 and recessed cavity 45 cooperate to prevent lateral motion of primary retainer pin 38 along imaginary longitudinal axis I through elongate slot 44.

Secondary retainer pin 40 may be disengaged from primary retainer pin 38 by rotating secondary retainer pin 40 in the opposite direction. Therefore, tip 70 may be extended or retracted to or from recessed cavity 45 by rotating screw head 64 in opposite directions. In the illustrated embodiment, secondary retainer pin 40 may be unscrewed and completely removed from primary retainer pin 38. This feature allows repair and or replacement of damaged components (e.g., secondary retainer pins, adapters). However, in other embodiments, secondary retainer pin 40 may be permanently coupled with, or integral to primary retainer pin 38.

In order to decouple removable tooth 33 and adapter 30, secondary retainer pin 40 is rotated and retracted away from recessed cavity 45, until tip 70 clears recessed cavity 45 of adapter 30. This allows primary retainer pin 38 to be removed from adapter 30. Accordingly, removable tooth 33 may be removed, reconditioned, and/or replaced upon adapter 30.

The teachings of the present invention may be used for coupling various excavation, earth moving, and/or mining equipment components. In general, any removable and/or replaceable component will benefit from the fastening and component cooperation techniques disclosed herein. More specifically, removable adapters may be coupled with tooth horns of buckets, shovels, or practically any heavy equipment components in accordance with the present invention. Similarly, ripper shanks may be coupled with various removable components provided to protect the ripper shank and/or prolong the life of the ripper shank. Another example of excavation equipment incorporating aspects of the present invention is described with regard to FIG. 4.

Figure 4:
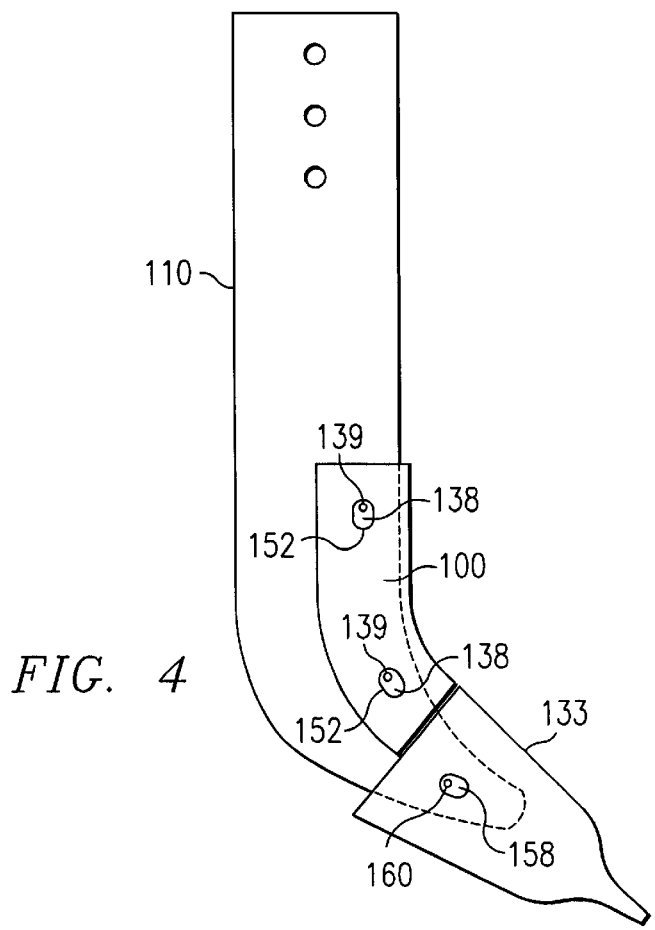
FIG. 4 is a side view of a ripper shank coupled with a removable tooth, and shroud, in accordance with another embodiment of the present invention.

FIG. 4 illustrates a shroud 100 coupled with a shank 110 of an excavating machine part. Shank 110 may be referred to as a "ripper shank." For the purposes of this specification, the term "adapter" includes a shank which may be coupled with various excavation equipment components, and may receive one or more removable teeth or shrouds. Shroud 100 provides protection to shank 110 when the excavating machine is in use. The excavating machine may be a dragline used in mining operations or any other machine used for excavating purposes. Shroud 100 is coupled with shank 110 using primary retainer pins 138, which are similar in configuration to primary retainer pin 38 of FIG. 1. Accordingly, fastening components similar to the primary retainer pins and secondary retainer pins described herein may be used to couple shroud 100 with shank 110. Similarly, such retaining pins and secondary retainer pins may be used to couple shank 110 with the excavation equipment component.

Primary retainer pins 138 may be inserted through openings 152, into respective elongate slots through shank 110, and extend at least partially into openings on a side of shroud 100 opposite openings 152. Secondary retainer pins 139 may be inserted into bores through retainer pins 138, and extend at least partially into recessed cavities which extend from the elongate slot through ripper shank 110. Secondary retainer pins 139 cooperate with the respective recessed cavities to prevent lateral movement of primary retainer pins 139. For purposes of this specification, shroud 100 may be considered a removable tooth, which protects one end of shank 110.

Shroud 100 is used to protect shank 110 from the abrasive environment encountered during excavation. Accordingly, shroud 100 is placed at a location upon shank 110 where significant wear and tear is anticipated. By providing a removable shroud 100 and removable tooth 133, wear and degradation of shank 110 is reduced, thereby increasing its overall service life.

Removable tooth 133 is coupled with shank 110 using primary retainer pin 158 and secondary retainer pin 160. Each of primary retainer pins 138 and 158, and secondary retainer pins 139 and 160 are configured and function similarly to primary retainer pin 38 and secondary retainer pin 40, respectively, to couple shroud 100 and tooth 133 with shank 110.

Although secondary retainer pin 40 of the present invention includes threads and a screw head, various configurations are available for secondary retainer pin 40. For example, secondary retainer pin 40 may be any retainer pin (e.g., a set screw) configured to be installed within bore 41, and to cooperate with recess 72 to prevent lateral movement of primary retainer pin 38. Alternatively, secondary retainer pin 40 may be coupled with primary retainer pin 38 and/or adapter 30 by another mechanical means, other than threads.

Figure 5:
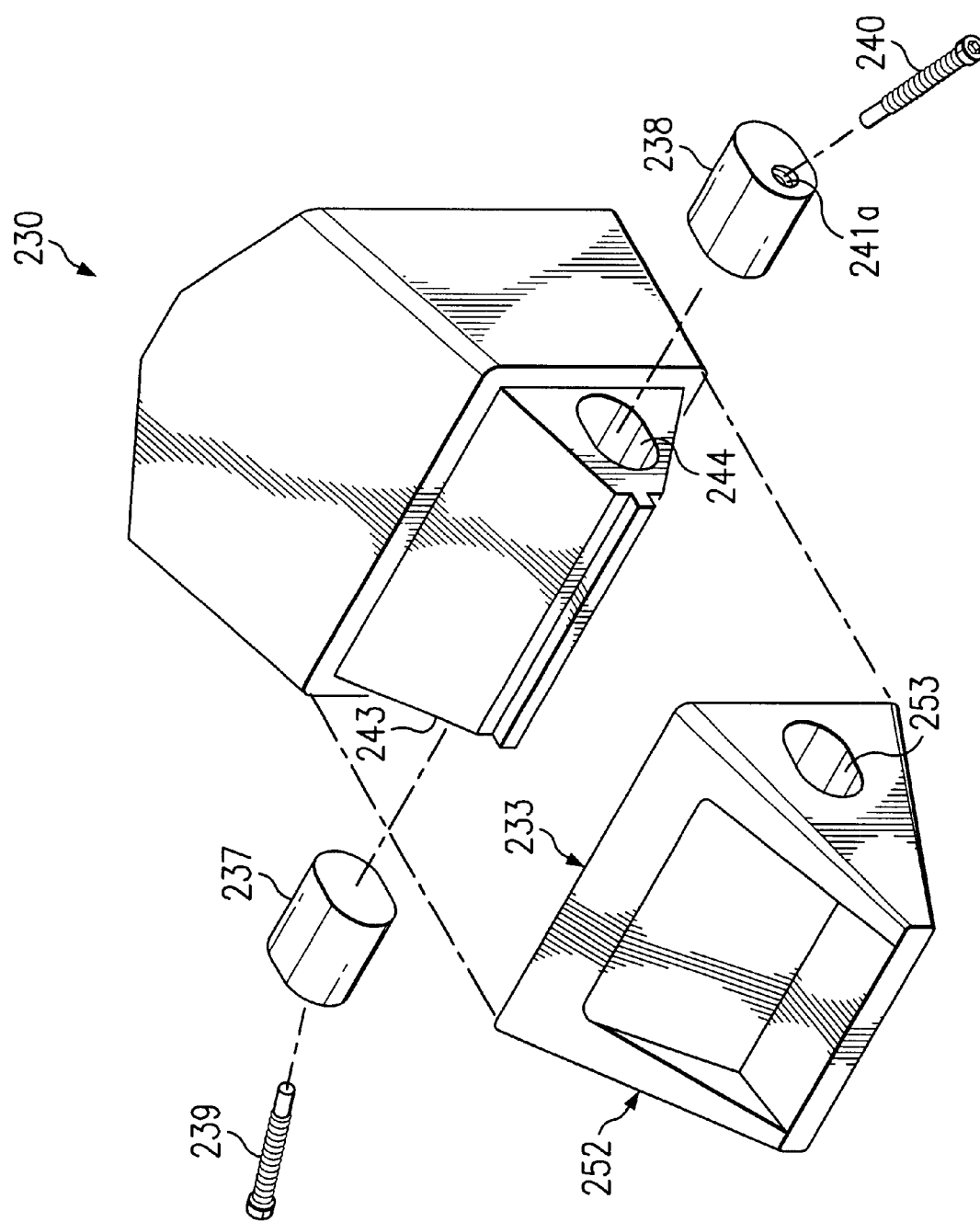
FIG. 5 is an isometric exploded view of an adapter and removable tooth which may be coupled using two primary retainer pins, in accordance with an alternative embodiment of the present invention.

In the illustrated embodiment, primary retainer pin 38 of FIGS. 1 and 2 extends through elongate slot 44, and at least partially into openings 52 and 53 of removable tooth 33. However, in alternative embodiments, the primary retainer pin(s) used to couple removable tooth 33 and an adapter may be more than one piece. For example, FIG. 5 illustrates an adapter 230 and removable tooth 233 which may be coupled together, in accordance with the teachings of the present invention. Adapter 230 and removable tooth 233 are coupled in a similar manner as adapter 30 and removable tooth 33, except two main retainer pins 237 and 238 are used.

In a particular embodiment of the present invention, removable tooth 233 is installed at least partially covering a portion of adapter 230. In the installed position, openings 252 (not expressly shown) and 253 of removable tooth 233 are aligned with slots 243 (not expressly shown) and 244 of adapter 230. Primary retainer pins 237 and 238 are configured to be installed through openings 252 and 253, respectively, and extend at least partially into slots 243 and 244, respectively.

Two secondary retainer pins 239 and 240 are used to couple primary retainer pins 237 and 238 with adapter 230. Since primary retainer pins 237 and 238, and secondary retainer pins 239 and 240 function similarly, only primary retainer pin 238 and secondary retainer pin 240 will be described in detail.

Secondary retainer pin 240 extends through a bore 241a, which extends at least partially through primary retainer pin 238. In the installed position, secondary retainer pin 240 is recessed with respect to primary retainer pin 238, and extends at least partially into a recessed cavity which extends from slot 244 and into adapter 230. This prevents lateral motion of primary retainer pin 238 with respect to adapter 230. This recessed cavity is similar to recessed cavity 45. In its installed position, primary retainer pin 238 extends from adapter 230 and cooperates with removable tooth 233, adjacent opening 253, to prevent decoupling of removable tooth 233 and adapter 230, during operation (e.g., excavation).

Slots 243 and 244 of FIG. 5 do not extend all the way through adapter 230, as elongate slot 238 of FIG. 1 extends all the way through adapter 30. Instead, slots 243 and 244 extend far enough into adapter 230 to accommodate primary retainer pins 237 and 238, respectively, in their installed positions. In an alternative embodiment, however, slots 243 and 244 may join in order to form a continuous slot which extends through adapter 230.

The embodiment of FIG. 5 includes two primary retainer pins 237 and 238, two secondary retainer pins 239 and 240, two slots 243 and 244, and two recessed cavities which are each similar to recessed cavity 45. In contrast, the embodiment of FIG. 1 includes one primary retainer pin 38, one secondary retainer pin 40, one slot 44, and one recessed cavity 45. However, primary retainer pin 237, secondary retainer pin 239, elongate slot 243, and the associated recessed cavity are configured and cooperate similar to primary retainer pin 38, secondary retainer pin 40, slot 44 and recessed cavity 45 of FIG. 1. Furthermore, primary retainer pin 238, secondary retainer pin 240, slot 244 and the associated recessed cavity are configured and cooperate similarly to such components. Each primary retainer pin 237 and 238 includes an independent secondary retainer pin 239 and 240, respectively, coupling the respective primary retainer pin with adapter 230, to prevent lateral movement of primary retainer pins 237 and 238.

Although embodiments of the invention and their advantages are described in detail, a person skilled in the art could make various alterations, additions, and omissions without departing from the spirit and scope of the present invention as defined by the appended claims.

What is claimed is:

1. An adapter assembly for use with excavation equipment, comprising:

an adapter having first and second adapter ends, and first and second adapter sides;

a removable tooth having first and second tooth sides, the removable tooth being coupled with the adapter and at least partially covering the first adapter end;

a central portion of the adapter defining an elongate slot which extends from the first adapter side to the second adapter side;

the first and second tooth sides having first and second openings, respectively, configured such that the first and second openings are aligned with an imaginary longitudinal axis of the elongate slot while the removable tooth is coupled with the adapter;

a primary retainer pin extending at least partially through the first and second openings and the elongate slot, the primary retainer pin being configured to cooperate with the removable tooth, adjacent the first and second openings, to couple the removable tooth and the adapter;

the primary retainer pin having a first face which is generally parallel with the first adapter side, and including an internal bore extending from the first face to a side of the primary retainer pin;

a secondary retainer pin extending from the internal bore and at least partially into a recessed cavity defined by the central portion, the recessed cavity extending from the elongate slot; and the secondary retainer pin cooperating with the primary retainer pin and the adapter adjacent the recessed cavity to limit movement of the primary retainer pin with respect to the adapter.

2. The adapter assembly of claim 1, wherein the primary retainer pin comprises an elongate oblong-shaped body having an oblong cross section.

3. The adapter assembly of claim 1, wherein a first end of the secondary retainer pin is slightly recessed with respect to the first face of the primary retainer pin and a second end of the secondary retainer pin extends at least partially into the recessed cavity.

4. The adapter assembly of claim 2, wherein the oblong cross-section has a wide dimension and a long dimension which is longer than the wide dimension, and wherein the internal bore extends at an angle to the long dimension such that a length of the internal bore is greater than the long dimension.

5. The adapter assembly of claim 1, wherein the internal bore includes a threaded region operable to engage corresponding threads of the secondary retainer pin.

6. The adapter assembly of claim 1, wherein the internal bore is configured to cooperate with a shoulder of the secondary retainer pin to prevent movement of the secondary retainer pin toward the recessed cavity, beyond an installed position of the secondary retainer pin within the primary retainer pin.

7. The adapter assembly of claim 6, wherein the secondary retainer pin includes a screw head which forms the shoulder.

8. The adapter assembly of claim 1, wherein the adapter comprises a ripper shank.

9. The adapter assembly of claim 1, wherein the removable tooth comprises a removable shroud.

10. The adapter assembly of claim 1, wherein the primary retainer pin is slightly recessed with respect to first and second outer surfaces of the first and second tooth sides, respectively.

11. The adapter assembly of claim 2, wherein the oblong cross-section has a wide dimension and a long dimension which is longer than the wide dimension, and the primary retainer pin is positioned such that an axis through the long dimension extends generally toward a tooth point of the removable tooth.

12. A method for coupling a removable tooth and an adapter assembly, comprising:

provide a first adapter having first and second adapter ends, and first and second adapter sides;

installing a removable tooth at least partially over the first adapter end, the removable tooth having first and second tooth sides;

inserting a primary retainer pin through a first opening of the first tooth side, into an elongate slot which extends from the first adapter side to the second adapter side, and at least partially through a second opening of the second tooth side;

the primary retainer pin having a first face at an end of the primary retainer pin, and being operable to cooperate with the removable tooth adjacent the first and second openings to couple the removable tooth and the adapter; and inserting a secondary retainer pin at least partially into a bore which extends from the first face to a side of the primary retainer pin until the secondary retainer pin engages the adapter at a location adjacent a recessed cavity formed by a central portion of the adapter, the recessed cavity extending from the elongate slot, the secondary retainer pin being operable to limit lateral movement of the primary retainer pin with respect to the adapter, along an imaginary longitudinal axis of the elongate slot.

13. A primary retainer pin for coupling excavation equipment components, comprising:

an elongate body having first and second faces at first and second ends of the elongate body, the elongate body forming a bore which extends from the first face to a surface of the elongate body adjacent a central portion of the elongate body; and the bore having a threaded region configured to cooperate with threads of a secondary retainer pin such that the secondary retainer pin may be coupled with the elongate body and extend at least partially through the bore.

14. The primary retainer pin of claim 13, further comprising the secondary retainer pin and wherein the secondary retainer pin is coupled with the elongate body.

15. The primary retainer pin of claim 14, wherein the secondary retainer pin may be adjusted between a first position in which a tip of the secondary retainer pin extends from the surface of the elongate body, and a second position in which the tip is recessed with respect to the surface of the elongate body.

16. The primary retainer pin of claim 13, wherein the primary retainer pin includes an oblong cross-section.

17. The primary retainer pin of claim 16, wherein the oblong cross-section has a wide dimension and a long dimension which is longer than the wide dimension, and wherein the bore extends at an angle to the long dimension such that a length of the bore is greater than the long dimension.

18. An adapter assembly for use with excavation equipment, comprising:

an adapter having first and second adapter ends, and first and second adapter sides;

a removable tooth having first and second tooth sides, the removable tooth being coupled with the adapter and at least partially covering the first adapter end;

a central portion of the adapter defining first and second slots which extend at least partially into the first adapter side and the second adapter side, respectively;

the first and second tooth sides having first and second openings, respectively, configured such that the first and second openings are aligned with the first and second slots, respectively, while the removable tooth is coupled with the adapter;

first and second primary retainer pins extending from the first and second slots, respectively, and at least partially through the first and second openings, respectively, the first and second primary retainer pins being operable to cooperate with the removable tooth adjacent the first and second openings, respectively, to couple the removable tooth and the adapter; and first and second secondary retainer pins extending from the first and second primary retainer pins, respectively, and least partially into first and second recessed cavities, respectively, formed in the central portion of the adapter, to limit lateral movement of the first and second primary retainer pins, respectively, with respect to the adapter.

19. A primary retainer pin for coupling excavation equipment components, comprising:

an elongate body having a bore extending at least partially therethrough, the bore being configured to receive a secondary retainer pin; and wherein the oblong cross-section has a wide dimension and a long dimension which is longer than the wide dimension, and wherein the bore extends at an angle to the long dimension such that a length of the bore is greater than the long dimension.

20. The primary retainer pin of claim 19, further comprising the secondary retainer pin.

21. The primary retainer pin of claim 20, wherein the secondary retainer pin may be adjusted between a first position in which a tip of the secondary retainer pin extends from a surface of the elongate body, and a second position in which the tip is recessed with respect to the surface of the elongate body.

22. An adapter assembly, comprising:

an adapter configured to receive a removable tooth at least partially thereon;

a primary retainer pin extending at least partially through the adapter, the primary retainer pin being operable to form at least a portion of a coupling between the adapter and the removable tooth;

a secondary retainer pin extending at least partially through an internal bore of the primary retainer pin, the internal bore extending from a face of the primary retainer pin to a side of the primary retainer pin;

the secondary retainer pin being operable to limit movement of the primary retainer pin with respect to the adapter; and wherein a head of the secondary retainer pin is accessible by a mechanic with a hand tool, while the adapter, removable tooth, and primary retainer pin are in an assembled position.

23. The adapter assembly of claim 22, wherein the primary retainer pin includes an oblong cross-section.

24. The adapter assembly of claim 23, wherein the oblong cross-section has a wide dimension and a long dimension which is longer than the wide dimension, and wherein the internal bore extends at an angle to the long dimension such that a length of the internal bore is greater than the long dimension.

25. The adapter assembly of claim 23, wherein the oblong cross-section has a wide dimension and a long dimension which is longer than the wide dimension, and wherein the primary retainer pin is positioned such that an axis through the long dimension extends generally toward a tooth point of the removable tooth.

* * * * *